United States Patent
Dong et al.

(10) Patent No.: US 12,407,780 B2
(45) Date of Patent: Sep. 2, 2025

(54) TRAINING MODELING ENGINES TO PREDICT CONTACT CENTER AGENT DEMAND

(71) Applicant: Zoom Communications, Inc., San Jose, CA (US)

(72) Inventors: Qiumin Dong, SuZhou (CN); Periyaven Naiken Gopalla, Burlingame, CA (US); Tao Huang, Hangzhou (CN); Wei Ji, San Jose, CA (US); Nicholas Troy Johnson, Argyle, TX (US); Eunkyung Kim, Glendale, CA (US); Bilung Lee, Los Angeles, CA (US); Vijay Venkataswamy Parthasarathy, San Jose, CA (US); Amarakota Madhu Vamsi, Andhra Pradesh (IN)

(73) Assignee: Zoom Communications, Inc., San Jose, CA (US)

( * ) Notice: Subject to any disclaimer, the term of this patent is extended or adjusted under 35 U.S.C. 154(b) by 174 days.

(21) Appl. No.: 18/309,807

(22) Filed: Apr. 30, 2023

(65) Prior Publication Data
US 2024/0364815 A1    Oct. 31, 2024

(51) Int. Cl.
*H04M 3/523* (2006.01)
*G06N 20/20* (2019.01)

(52) U.S. Cl.
CPC .......... *H04M 3/5238* (2013.01); *G06N 20/20* (2019.01)

(58) Field of Classification Search
None
See application file for complete search history.

(56) References Cited

U.S. PATENT DOCUMENTS

| 9,912,813 | B2 | 3/2018 | Vymenets et al. |
| 2007/0274502 | A1 | 11/2007 | Brown |
| 2014/0211933 | A1 | 7/2014 | Vymenets et al. |
| 2018/0091654 | A1 | 3/2018 | Miller et al. |
| 2020/0334615 | A1* | 10/2020 | Benjamin ............ G06Q 30/016 |

(Continued)

FOREIGN PATENT DOCUMENTS

AU    2021311838 A1    2/2023

OTHER PUBLICATIONS

What is Erlang C and how is it used for call centers? https://www.techtarget.com/searchunifiedcommunications/definition/Erlang-C, Rahul Awati, Apr. 27, 2023, 7 pages.

(Continued)

*Primary Examiner* — Nafiz E Hoque
(74) *Attorney, Agent, or Firm* — Young Basile Hanlon & MacFarlane, P.C.

(57) ABSTRACT

A contact center server obtains historical contact center data of a contact center by tracking contact center conditions. The contact center server trains, based on the historical contact center data, multiple modeling engines to generate agent demand data representing a number of agents working at a given time. The contact center server trains, based on the historical center contact center data and performance data of the multiple modeling engines, a combination engine to generate a combination of one or more modeling engines from the multiple modeling engines. The contact center server provides an output representing the trained combination engine and the multiple modeling engines.

20 Claims, 11 Drawing Sheets

(56) References Cited

U.S. PATENT DOCUMENTS

| | | | |
|---|---|---|---|
| 2021/0271925 A1* | 9/2021 | Yocum | H04M 3/5238 |
| 2022/0027837 A1* | 1/2022 | D'Attilio | H04M 3/5175 |
| 2022/0180276 A1* | 6/2022 | Silverman | G06Q 10/06315 |
| 2022/0263703 A1 | 8/2022 | McConnell et al. | |
| 2023/0015083 A1 | 1/2023 | Shete et al. | |

OTHER PUBLICATIONS

Medium.com, Facebook/prophet in 2023 and beyond, https://medium.com/@cuongduong_35162/facebook-prophet-n-2023-and-beyond-c5086151c138, Cuong Duong, Feb. 26, 7 pages.

Prophet, Forecasting at scale, https://facebook.github.io/prophet/, Apr. 16, 2023, 4 pages.

Predicting Demand for 311 Non-Emergency Municipal Services: An Adaptive Space-Time Kernel Approach, Li Xu, Mei-Po Kwan, Sara McLafferty, Shaowen Wang, Department of Geography and Geographic Information Science, University of Illinois at Urbana-Champaign, https://www.sciencedirect.com/science/article/abs/pii/S0143622817304538, Oct. 29, 2017, 36 pages.

Google Research, Federated Learning: Collaborative Machine Learning without Centralized Training Data—Google AI Blog, Brendan McMahan and Daniel Ramage, Research Scientists, https://ai.googleblog.com/2017/04/federated-learning-collaborative.html, Apr. 6, 2017, 5 pages.

IBM, What is federated learning? IBM Research Blog, Kim Martineau, https://research.ibm.com/blog/what-is-federated-learning, Aug. 24, 2022, 8 pages.

International Search Report and Written Opinion mailed on Aug. 13, 2024 in corresponding PCT Application No. PCT/US2024/026952.

\* cited by examiner

TRAINING MODELING ENGINES TO PREDICT CONTACT CENTER AGENT DEMAND

FIELD

This disclosure relates to artificial intelligence and machine learning. Some implementations relate to training modeling engines to predict contact center agent demand and inference using the trained modeling engines.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
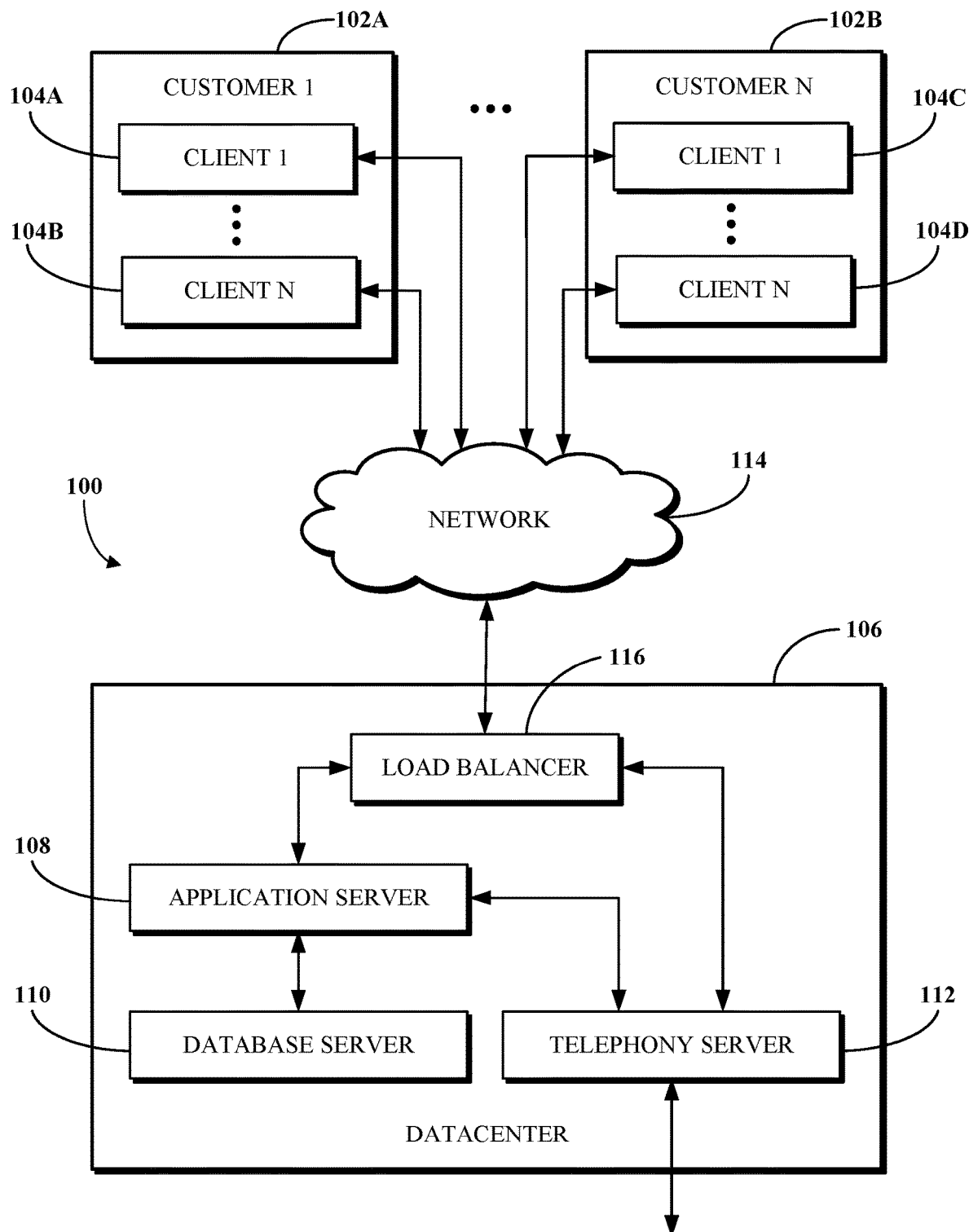
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) or contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

The volume of users accessing the contact center and, therefore, the demand for contact center agents may vary over time. For example, the contact center of a mobile phone manufacturer may have user volumes that are higher when new products are released, when there are software updates, on weekends, or during the winter holiday season, but which are lower at other times during the year. Similarly, consumer demand or need may be difficult to accurately measure using conventional tools because there are multiple variables involved, and different variables might be driving the consumer demand at different times. It is, in any event, very important for contact centers to appropriately staff agents to address user engagements. That is, understaffing agents at a contact center may lead to long wait times for users. On the other hand, overstaffing agents at the contact center may be expensive. As the foregoing illustrates, techniques for predicting demand for contact center agents may be useful in order to ensure that there is a sufficient number of contact center agents available to service the users without overstaffing the contact center.

Implementations of this disclosure address problems such as these by using artificial intelligence or machine learning technology to predict the staffing needs of the contact center. Multiple modeling engines are trained to predict staffing needs based on historical contact center data. The historical contact center data may include historical information about an engagement volume, user volume data, engagement length data, contact center user wait time data, or contact center agent availability data. The historical contact center data may also include historical data relevant to an industry of the operator of the contact center (e.g., winter holiday season for retail or financial events for a stock brokerage). The multiple modeling engines may include, for example, an artificial neural network engine, an engine that calculates staffing needs based on an average need for a given day of the week (e.g., Wednesday), or an engine that takes into account a day of the week and a month of the year (e.g., Saturday in December). The multiple modeling engines may execute on different hardware or may have different software structures. For example, the multiple modeling engines may include at least one of a weighted weekly moving average engine, a long short-term memory engine, or a time-series forecasting engine.

In addition, a combination engine is trained to determine a combination of one or more modeling engines from the multiple modeling engines to predict the staffing needs at a given date/time. (The combination may be generated in different ways. In some cases, a weighted sum-based combination (e.g., W1 multiplied by the output of one model plus W2 multiplied by the output of another model, where W1 and W2 are weights, which are real numbers) may be used. In some cases, the combination is generated by model ensembling. In some cases, the combination is generated by federation, where federation may include, among other things, a technique of combining modeling engines that does not modify the modeling engines and allows the modeling engines to run independently of one another and independently of the combination engine (e.g., the federation engine).) The combination engine and the multiple modeling engines are used to predict the contact center staffing needs. In some cases, the combination engine may transmit the output of the combination of one or more modeling engines to an administrator device associated with an administrator of the contact center. Alternatively, the combination engine may automatically prompt contact center agents (via contact center agent devices) to accept additional work hours (e.g., overtime hours).

During the inference phase, a server hosting the combination engine receives, from an administrator device of an administrator of the contact center, a request to determine a number of agents working at a future time. The request may be coupled with a service level target (e.g., m % of users connected to a contact center agent within n seconds, where m is a number greater than 0 and less than or equal to 100 and n is a positive integer) for the contact center. The combination engine generates a combination of one or more modeling engines for determining the number of agents. For example, the combination may be a function (e.g., mean or median) of the outputs of the modeling engines. The server determines, using the combination of the one or more modeling engines, the number of agents working at the future time. The server provides an output representing the number of agents. The output may be presented on a dashboard at the administrator device. The output may include a link for transmitting, to agent devices of the contact center agents, a prompt to accept extra work hours (e.g., overtime hours).

To describe some implementations in greater detail, reference is first made to examples of hardware and software structures used to implement training and inference using modeling engines to predict contact center demand. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider or a CCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform or a CCaaS platform. The datacenter 106 as generally illustrated includes an application server 108, a database server 110, and a telephony server 112. (It should be noted that the telephony server 112 could provide services other than telephony services, for example, instant messaging services, social media messaging services, audio communication services, or video communication services associated with UCaaS or CCaaS. In some cases, the telephony server 112 may be an interaction server, or may be replaced with an interaction server.) The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform or the CCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 (or the interaction server) can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform or a CCaaS platform. For example, the application server 108 can implement all or a portion of a UCaaS platform or a CCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
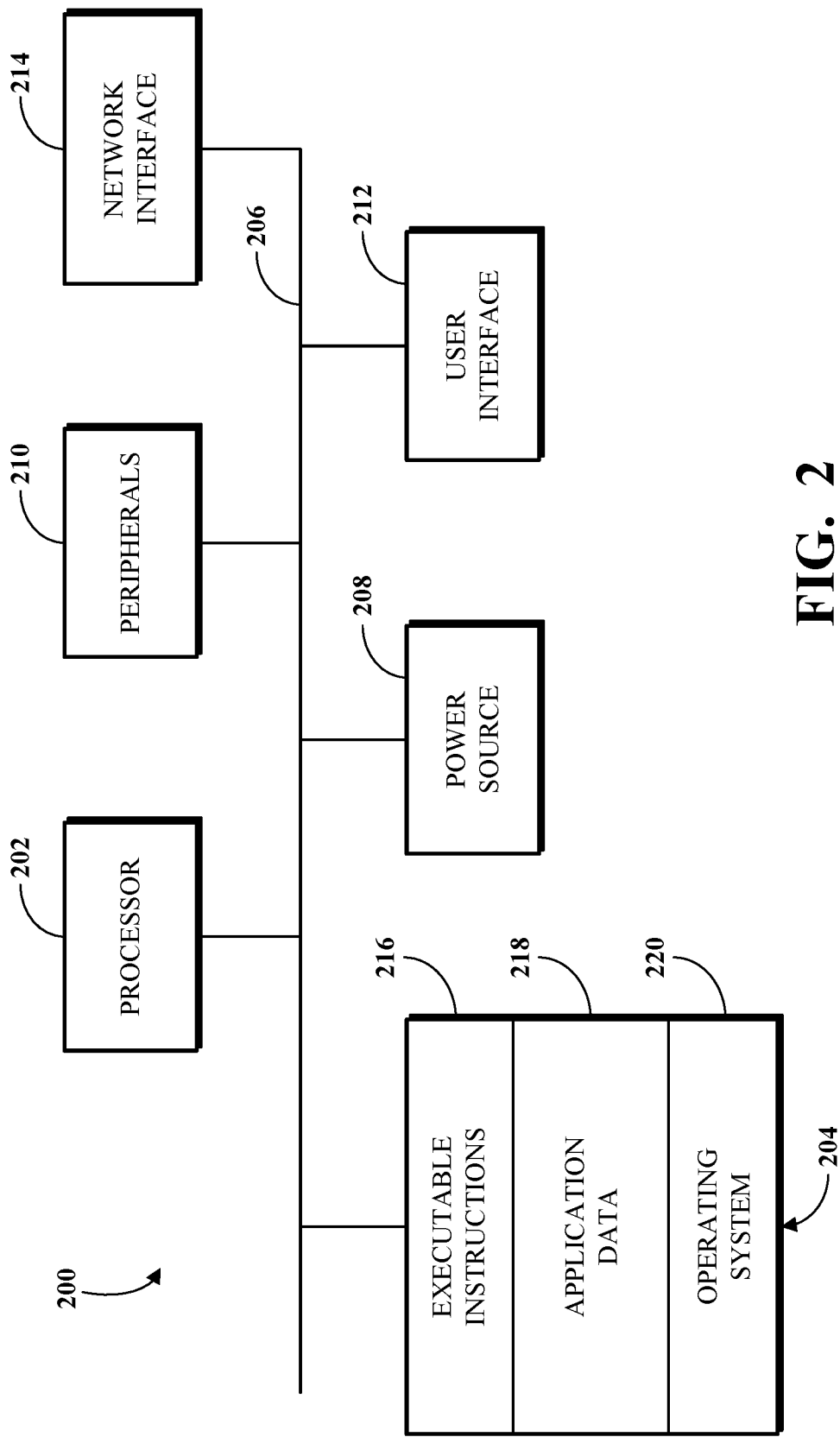
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
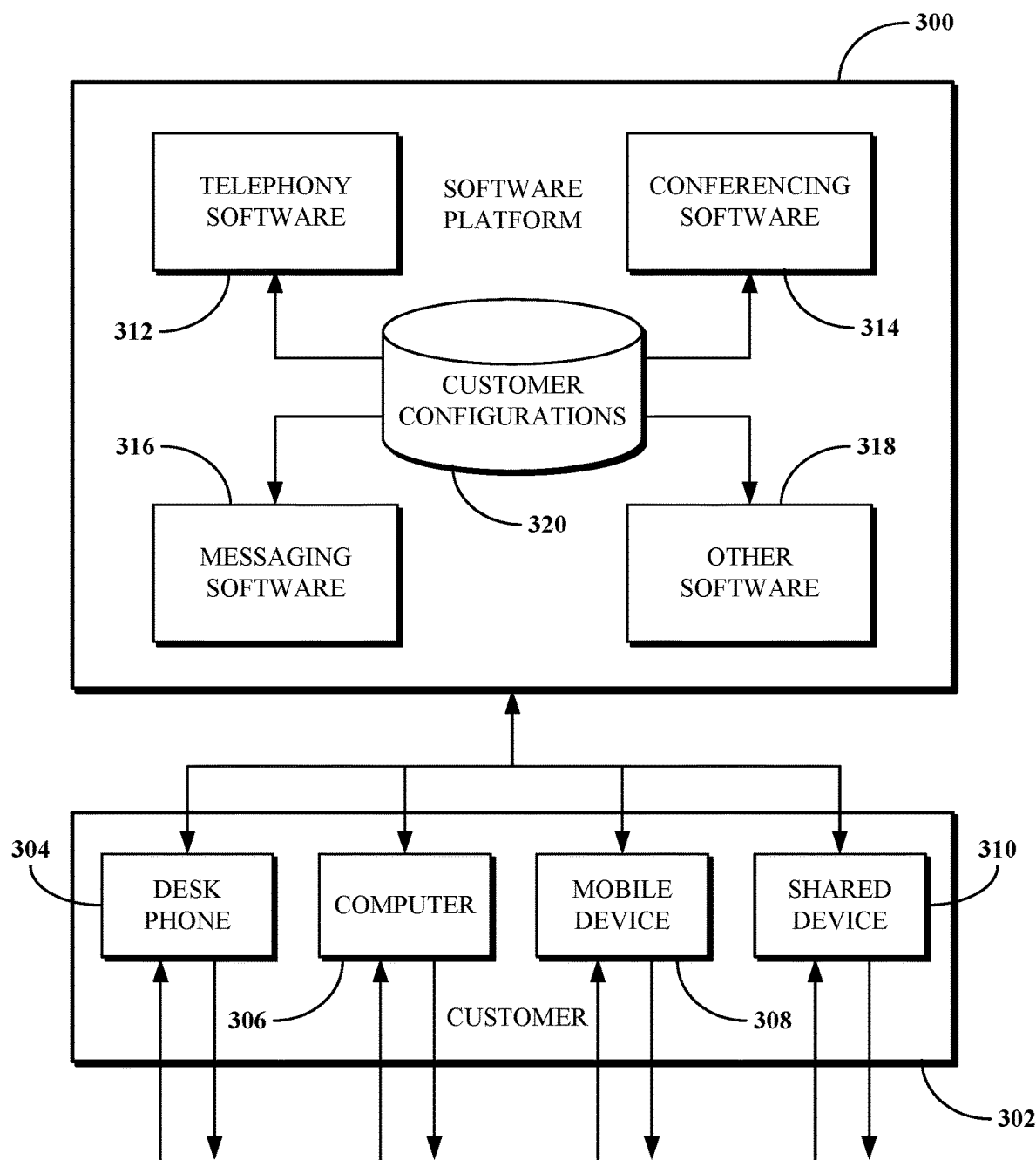
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310

(e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include modeling engines and/or a combination engine to predict contact center agent demand.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
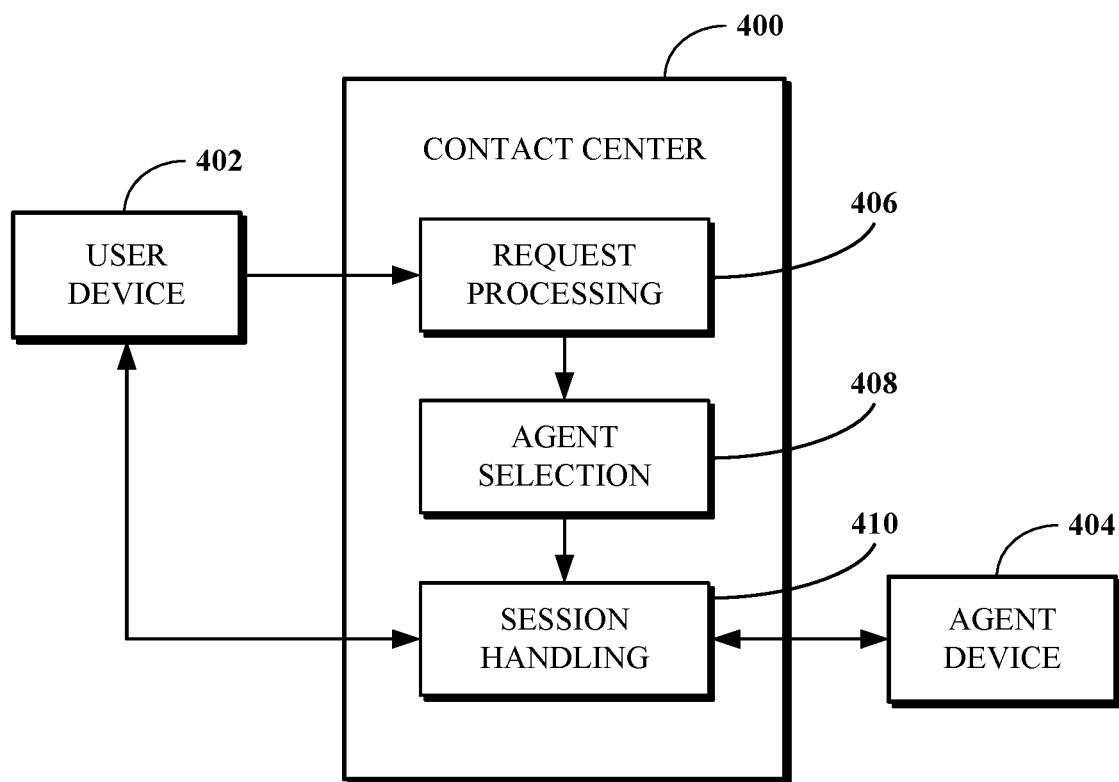
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a7 client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
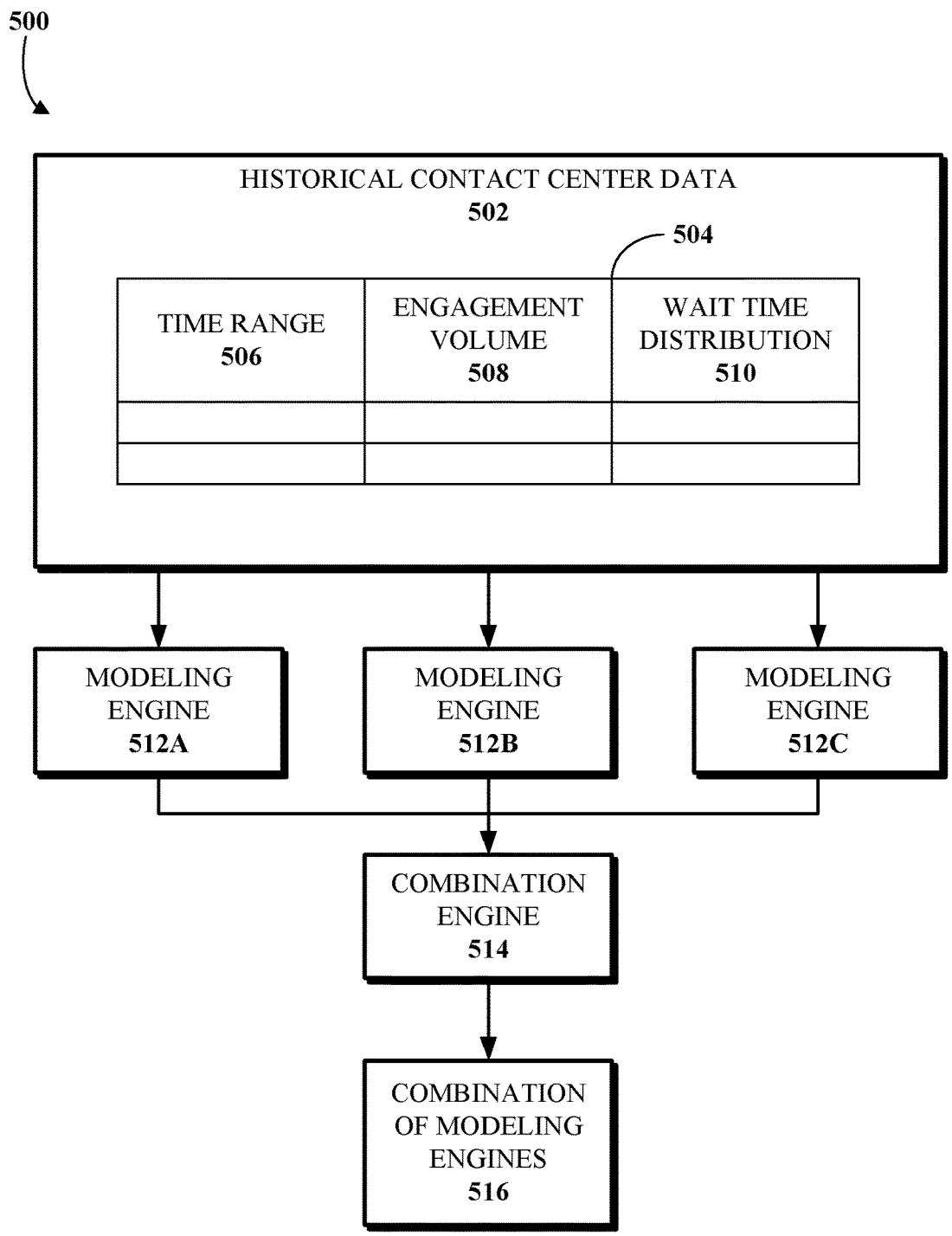
FIG. 5 is a block diagram of an example system for training modeling engines to predict contact center agent demand.

FIG. 5 is a block diagram of an example system 500 for training modeling engines to predict contact center agent demand (e.g., in order to meet a service level target). As shown, the system 500 includes historical contact center data 502. The historical contact center data may be associated with a contact center (e.g., the contact center 400). The historical contact center data 502 includes a table 504 including columns for time range 506, engagement volume 508, and wait time distribution 510. Each row is associated with a time range (e.g., 9:00 am-10:00 am Eastern Daylight Time on Apr. 1, 2022) and stores an engagement volume (e.g., a total number of engagements or a number of engagements per unit time, where an engagement may include a user accessing the contact center via a medium, such as voice call, video call, or instant message; the engagement volume may be a total engagement volume) during the time range and a data structure indicating a wait time distribution of users who accessed the contact center during the time range. For example, the data structure may indicate that 30% of user waited less than 30 seconds, 45% of user waited 30-60 seconds, 20% of users waited 60-90 seconds, and 5% of users waited over 90 seconds during the time range of 9:00 am-10:00 am Eastern Daylight Time on Apr. 1, 2022. While the historical contact center data 502 is described as including a table 504, in alternative implementations, a data structure different from a table (e.g., a linked list, a queue, or a stack) may be used to store the data illustrated as being stored in the table 504.

The historical contact center data 502 may be obtained by tracking contact center conditions via a server of the contact center (e.g., the contact center 400). For example, during each hour (or other range of time) of a day, week, or month, the contact center server may track the engagement volume and the wait time distribution for the contact center users. The wait time for each user may be measured as a time difference between a time when a user requests connection to an agent and a time when the user is connected to the agent. The tracked values (e.g., the time range 506, the engagement volume 508, and the wait time distribution 510) may be stored in the table 504 of the historical contact center data 502.

As illustrated, modeling engines 512A-512C access the historical contact center data 502. Each modeling engine 512A-512C may access all or a portion of the historical contact center data 502. While three modeling engines 512A-512C are illustrated, the disclosed technology may be implemented with other numbers of modeling engines. Each modeling engine 512A-512C may executed at a different location (e.g., a different server) and may rely on different parts of the historical contact center data 502 or different additional data (e.g., financial event data, data related to holiday shopping seasons, or data representing the day of the week) The modeling engines 512A-512C may include at least one of a rule-based, a machine learning-based, or an artificial intelligence-based modeling engine. The modeling engines 512A-512C may include at least one of a weighted weekly moving average engine, a long short-term memory engine, or a time-series forecasting engine.

In some cases, one of the modeling engines 512A-512C may be a prophet model. A prophet model includes a model forecasting time series data based on an additive model where non-linear trends are fit with yearly, weekly, and daily seasonality, plus holiday effects. The modeling engines 512A-512C may take into account different seasonality values based on the entity operating the contact center. For example, a contact center of a retailer might take into account winter holiday shopping season. A contact center of a stock brokerage might take into account dates when financial events occur or tax-related deadlines. A duck hunting related contact center might take into account dates of the duck hunting season. A technology support related contact center might take into account dates on which software updates on major software platforms occur.

Each modeling engine 512A-512C is trained based on the historical contact center data accessed by the modeling engine 512A-512C to generate a model predicting demand for contact center agents in order to meet a service level target. A service level target may include a percentage of users being connected to an agent within a time period of requesting the connection (e.g., the user saying "I wish to speak to a representative," pressing a button to speak to a representative, or selecting an on-screen icon for speaking to a representative). The percentage or the time period may be set by an administrator of the contact center using an administrator device (or by another person or machine). For example, the service level target may specify that 80% of users are connected to an agent within 45 seconds of requesting the connection.

As shown, the system 500 includes a combination engine 514 accesses the modeling engines 512A-512C. The combination engine 514 generates a combination of modeling engines 516. The combination of modeling engines 516 is a combination of the modeling engines 512A-512C that is predicted, by the combination engine 514, to be the most accurate in predicting contact center agent demand. For example, the combination of the modeling engines 512A-512C may be the sum of 0.6 multiplied by the output of the modeling engine 512A and 0.4 multiplied by the output of the modeling engine 512B (or another mathematical combination of the outputs of the modeling engines 512A-512C).

The combination engine 514 may include at least one of a rule-based engine, an artificial intelligence engine, or a machine learning engine. The combination engine 514 may be trained using the historical contact center data 502 and the modeling engines 512A-512C (e.g., 512A, 512B, 512C). For example, the combination engine 514 may be trained by comparing the number of agents proposed by the modeling engines 512A-512C at different time ranges with the data in the table 504 for the service level that was provided at the associated time ranges. The service level provided may be determined based on the wait time distribution 510.

The combination engine 514 enables multiple modeling engines 512A-512C to collaborate and exchange information in a coordinated manner to improve the overall performance of a predicting contact center agent demand based on a service level target. The combination engine 514 allows for the distribution of training and inference workloads across the multiple modeling engines 512A-512C, which can be located in different locations, running on different servers, or accessing different parts of the historical contact center data 502 or other data. The combination engine 514 enables the aggregation of the results of the modeling engines 512A-512C to make predictions. The combination of modeling engines 516 generated by the combination engine 514 can be organized in a hierarchical structure, where different modeling engines 512A-512C can learn from and influence each other's outcomes. In one example, the combination of modeling engines 516 corresponds to a weighted combination of the modeling engines 512A-512C, with the weights being determined by the combination engine 514.

The engines of FIG. 5—the modeling engines 512A-512C, the combination engine 514, and the combination of modeling engines 516—may be stored at a server (or multiple servers) of the contact center 400. The historical contact center data 502 may be stored in a data repository (e.g., a database or another data storage unit) of the contact center 400. The modeling engines and the combination engine are capable of predicting the engagement volume (e.g., a value for a future time corresponding to the engagement volume 508) and the average handling time for the engagements. To calculate the proposed number of agents, some implementations may use a traffic modeling technique (e.g., a traffic modeling formula such as Erlang-c) by taking the estimated engagement volume and the average handling time for the modeling engine, as well as key metrics (such as the service level target, shrinkage, and the average speed of answer) from an administrator device, which may be operated by an administrator of the contact center. Erlang-c is a traffic modeling technique, which may be used in contact center scheduling to calculate delays and to predict waiting times for users. This technique enables contact centers to predict their load and calculate the number of contact center agents to service the desired number of users to achieve a service level target.

The modeling engines 512A-512C may be implemented in different ways. In some examples, one or more of the modeling engines 512A-512C is a rule-based (e.g., moving average). This kind of model does not involve any model parameters. In some examples, one or more of the modeling engines 512A-512C is a model designed for time series forecasting, for example an Autoregressive Integrated Moving Average (ARIMA) model or a prophet model. These models leverage parameters but do not leverage a loss function or an error metric. In some examples, one or more of the modeling engines 512A-512C leverages traditional supervised learning modeling, which may include, among other things, xgboost (extreme gradient boosting) or traditional statistical models. These models can be used to solve any prediction or forecasting problem, but not designed specifically for solving time series forecasting (although these models can be leveraged for that task). In some examples, one or more of the modeling engines 512A-512C leverages an artificial neural network (ANN) supervised learning model, for example, a long short-term memory engine, a convolutional neural network (CNN), or another ANN using a transformer structure. Long short-term memory and transformer structure-based models (e.g., generative pre-trained transformer (GPT)) are more generally used as language models. However, these models can be transformed from predicting words following a given word in a phrase or sentence to forecasting future agent numbers given past agent numbers and a service level target.

As discussed above, the modeling engines 512A-512C may include at least one of a weighted weekly moving average engine, a long short-term memory engine, a time-series forecasting engine, or a convolutional neural network (CNN). A weighted weekly moving average engine calculates a target value (e.g., representing demand for contact center agents) of a set of data over a predetermined period of time. In particular, it uses a weighted average approach to give greater importance to more recent data points. The weighted weekly moving average engine receives input data on a weekly basis and maintains a rolling window of the most recent n weeks of data, where n is a predetermined number. The weighted weekly moving average engine then calculates a weighted average of the data within the window, with the weights assigned to each data point based on its position within the window. More specifically, the weight assigned to each data point is inversely proportional to its age, such that more recent data points are given greater weight. The weighted weekly moving average engine may use any weighting function to determine the weights. For example, a linear or exponential decay function may be used. The weighted average is provided as the output (e.g., corresponding to the demand for the contact center agents).

A long short-term memory engine may include an artificial neural network that is designed to process sequential data. The long short-term memory engine uses specialized memory cells and gating mechanisms to selectively store and retrieve information from past times (e.g., in the table 504) which can be used to make predictions about future demand for contact center agents. The long short-term memory engine receives input in the form of a time series for contact center-related variables (e.g., the data in the table 504 and, in some cases, additional data, such as data about financial events for a stock brokerage contact center, data about home listings for a real estate agency contact center, or data about school vacation dates for a tourist resort that tailors to families with children). The long short-term memory engine then processes these data in a step-by-step manner, with each step producing an output vector that is used to predict demand for contact center agents. The memory cells store and retrieve the information over multiple time steps. Each memory cell is controlled by a set of gating mechanisms (e.g., sigmoid or tan h functions), which regulate the flow of information into and out of the cells. Memory cells may receive weighted inputs from other memory cells or from the input data, with the weights being learned through backpropagation during training of the long short-term memory engine.

A time series forecasting engine is a system designed to analyze historical data and generate accurate predictions about future trends. In the context of contact center agent demand prediction, the time series forecasting engine receives input data in the form of a time series of variables (e.g., in the table 504) and uses mathematical and statistical techniques, such as exponential smoothing, ARIMA models, or machine learning algorithms, to analyze the data and identify patterns and trends. The identified patterns and trends are leveraged to predict future contact center agent demand.

Each of the modeling engines 512A-512C and/or the combination engine 514 may include one or more CNNs. A CNN may include multiple artificial neurons, with each artificial neuron receiving input from sources (either the original input set or other artificial neurons) and applying weights to the input received from the sources. The training process for the CNN includes determining the optimal values for the weights of the CNN's connections. This is typically achieved through an iterative process of adjusting the weights in response to the error between the network's output and the desired output for a given set of training data. During training, the weights of the CNN are updated using an optimization algorithm such as gradient descent. The algorithm calculates the gradient of the loss function with respect to the weights and uses this information to adjust the weights in a direction that reduces the loss. This process is repeated for multiple iterations until the weights converge to values that minimize the loss function, indicating that the CNN has been successfully trained to perform its intended task.

In some cases, training an ANN (e.g., a CNN) may include reducing an error metric. The error metric may correspond to a difference between a measured average user wait time (e.g., from the table 504 of the historical contact center data 502) and an average user wait time calculated based the modeling engine 512A-512C being trained or the combination of modeling engines 516 generated by the combination engine 514. Some examples of the disclosed technology (e.g., rule-based, ARIMA or prophet model) do not leverage an error metric. For example, supervised learning models and ANN-based models may leverage a loss function, and may include defining a loss function to let the model learn its parameters to regress to the optimal point (with the lowest error metric). However, other models (e.g., rule-based or moving average models) might not leverage an error metric.

In some implementations, the modeling engines 512A-512C and/or the combination engine 514 are trained using online learning. Additional data may be added to the historical contact center data 502 after the modeling engines 512A-512C and/or the combination engine 514 have been initially trained. The modeling engines 512A-512C and/or the combination engine 514 may be further trained using the additional data. As a result, the weights in the CNNs of the modeling engines 512A-512C and/or the combination engines may be adjusted as the available training data changes.

Figure 6:
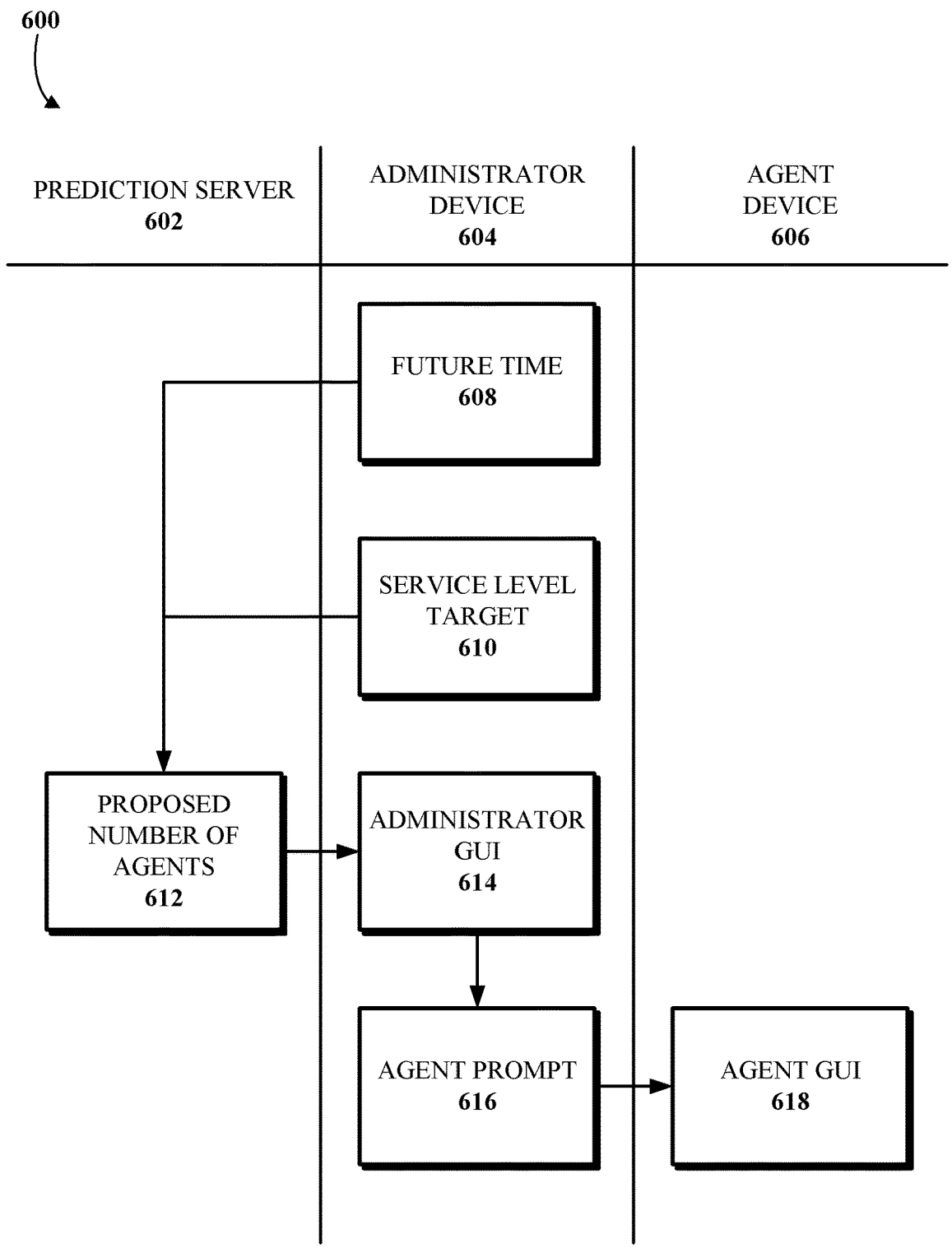
FIG. 6 is a data flow diagram of an example of predicting contact center agent demand.

FIG. 6 is a data flow diagram 600 of an example of predicting contact center agent demand. As shown, the data flow diagram 600 is implemented using a prediction server 602, an administrator device 604, and an agent device 606.

The prediction server 602 may include the trained modeling engines 512A-512C, the trained combination engine 514, and the trained combination of modeling engines 516 and may be a server of the contact center 400. The prediction server 602 is described here as a server. However, in some cases, the functionality of the prediction server 602 may be performed in the cloud or at a virtual machine. In some cases, the prediction server 602 may include multiple servers. The administrator device 604 may be a device of an administrator of the contact center 400. The agent device 606 may correspond to the agent device 404.

As shown in FIG. 6, the administrator device 604 transmits an indication of a future time 608 and a service level target 610 to prediction server 602. In some cases, the administrator device 604 does not transmit the indication of the future time 608, and the combination of modeling engines is automatically executed for all times in an upcoming time period (e.g., the next week) when the contact center is open. An example of a user interface for inputting the service level target 610, which may be presented via the administrator device 604 to a user thereof, is described below in conjunction with FIG. 7.

The prediction server 602 receives the future time 608 and the service level target 610 from the administrator device 604 and calculates a proposed number of agents 612 for the future time 608 based on the service level target 610. In some cases, the prediction server 602 uses the combination of modeling engines 516 to calculate the proposed number of agents 612. The combination of modeling engine 516 is identified by the combination engine 514 from the modeling engines 512A-512C. In some cases, the combination engine 514 generates the combination of modeling engines 516 based on the service level target 610 and the future time 608 after those values are received by the prediction server 602. Alternatively, the combination engine 514 may generate the combination of modeling engines 516 before the future time 608 and the service level target 610 are received. In some cases, contact centers for different entities use different combinations of modeling engines 516. For example, a contact center for an online store might rely more heavily on the day of the week and the month of the year for predicting contact center demand, while a contact center for a sports betting service might rely more heavily on dates when sports games occur.

Figure 8:
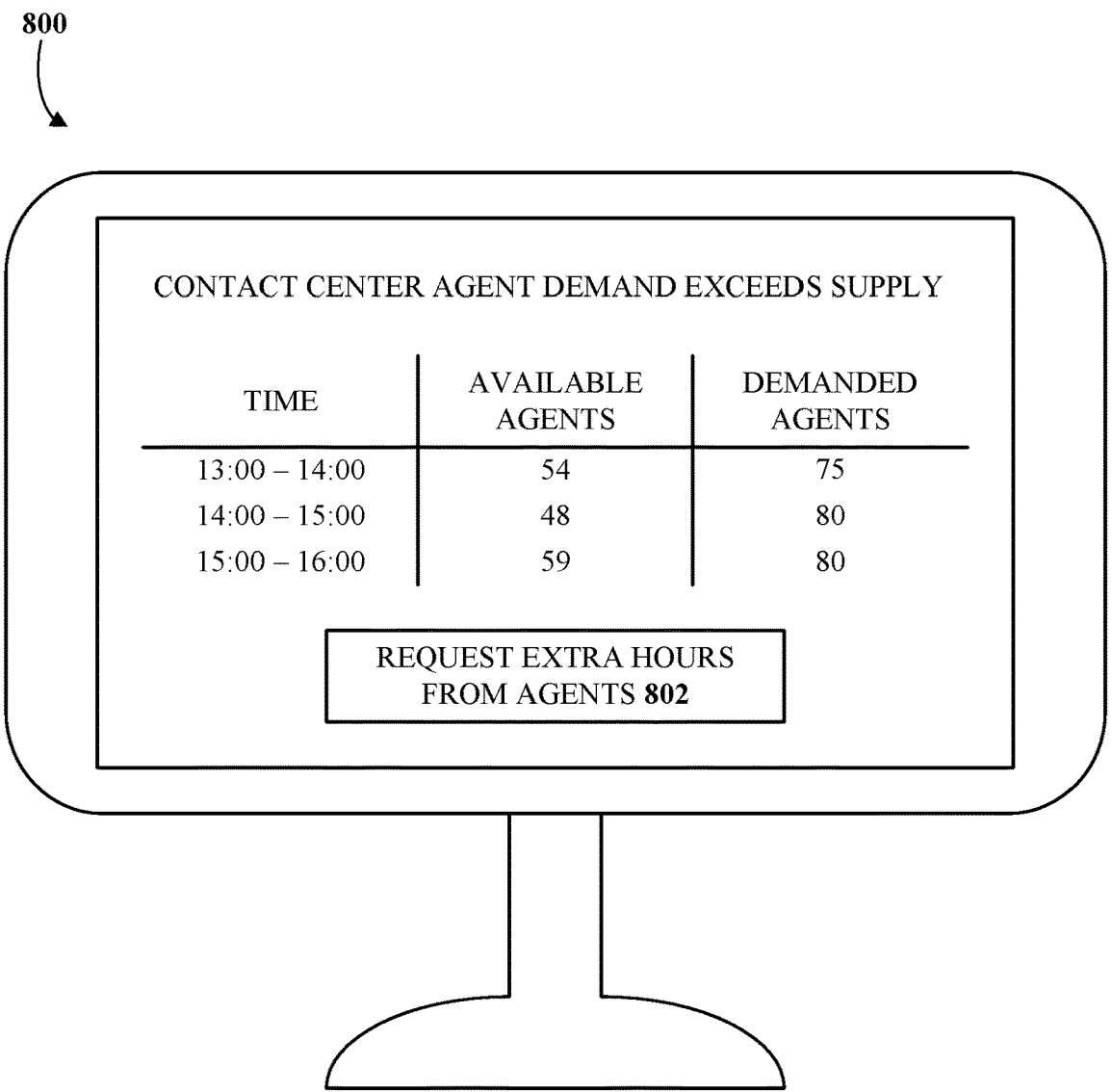
FIG. 8 illustrates an example graphical user interface for presenting contact center agent demand.
Figure 9:
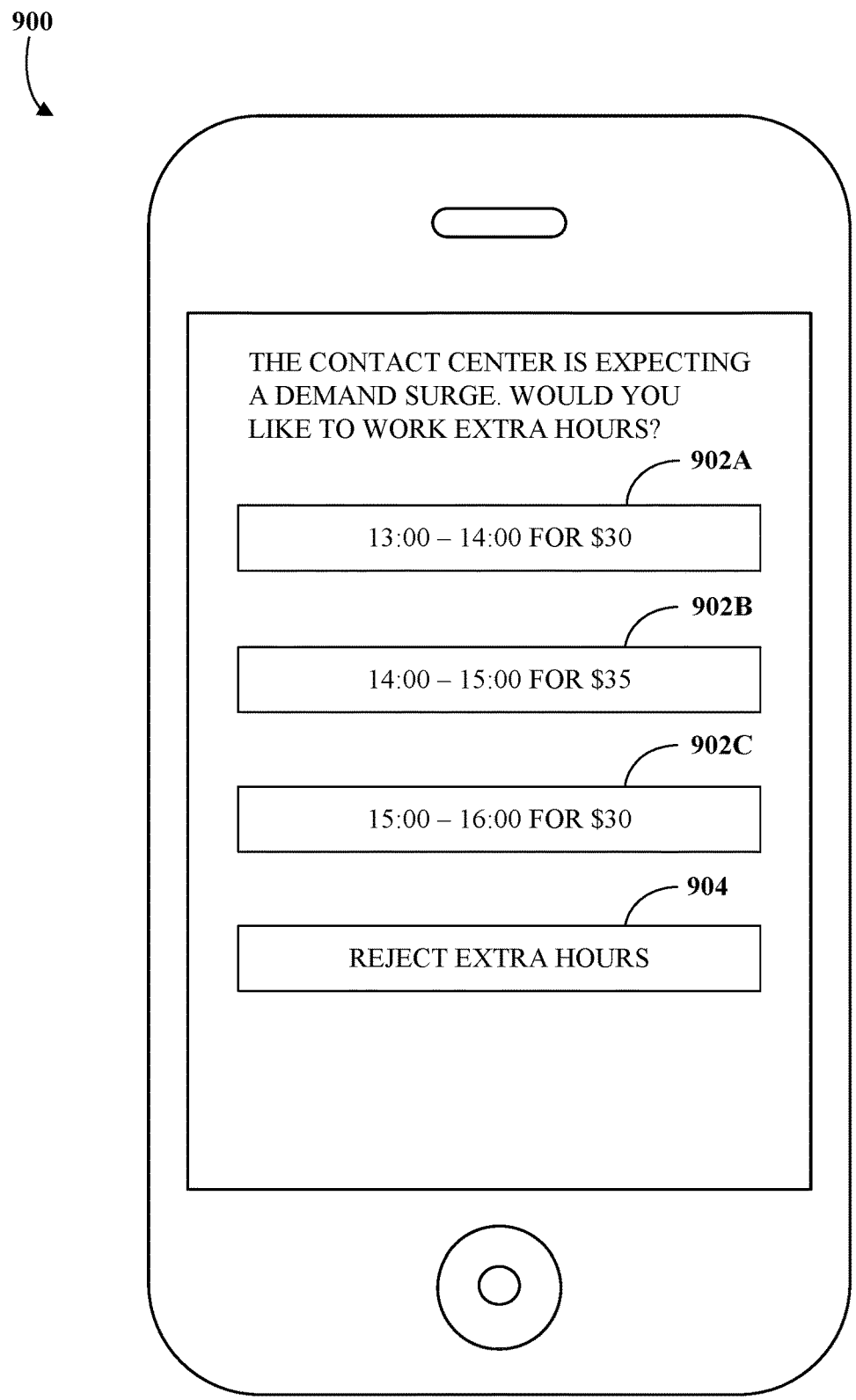
FIG. 9 illustrates an example graphical user interface for prompting a contact center agent to work extra hours.

As shown, the prediction server 602 transmits the proposed number of agents 612 to the administrator device 604 for presentation, at the administrator device 604, via an administrator graphical user interface (GUI) 614. The administrator GUI 614 may indicate the future time 608, the number of available agents that are scheduled to be working at the future time 608, and the proposed number of agents 612. An example of the administrator GUI 614 is shown in FIG. 8 and described in detail below. If the proposed number of agents 612 exceeds the number of available agents that are scheduled to be working, the administrator using the administrator device 604 may take action to increase the number of available agents that are scheduled to be working. In some cases, the administrator GUI may include an interface icon for transmitting an agent prompt 616 to an agent (or multiple agents) who is not scheduled to be working to prompt those agents to accept additional (e.g., overtime) work hours. The agent prompt 616 may include at least one of an email message, a short messaging service (SMS) message, a push notification, or a message transmitted in an instant messaging application. As shown, the agent prompt 616 is transmitted from the administrator device 604 to the agent device 606. At the agent device 606, the agent prompt 616 is displayed via an agent GUI 618. The agent GUI 618 may prompt the agent using the agent device 606 to accept extra hours. In some cases, the agent prompt indicates an amount of money (or other compensation) that the agent would receive for accepting the extra hours. The agent GUI 618 may include a user interface icon (e.g., a button) for accepting or rejecting the extra hours and transmitting an indication of the acceptance or the rejection of those extra hours to the administrator device 604. An example agent GUI 618 is illustrated in FIG. 9 and described in detail below.

Some implementations of the disclosed technology are described herein as being implemented at a contact center. However, the disclosed technology is not limited to being implemented at a contact center, and could be used to predict demand in other contexts where demand is variable and a service level target can be defined. For example, a taxi service may use the disclosed technology to predict demand for human or machine-implemented taxi drivers. A car rental service may use the disclosed technology to predict demand for rental cars. A brick-and-mortar store may use the disclosed technology to predict demand for checkout clerks or the demand for products sold by the store. An accounting firm may use the disclosed technology to predict demand for accountants. A babysitting service may use the disclosed technology to predict demand for babysitters. A hospital may use the disclosed technology to predict demand for hospital beds, doctors of various specialties (e.g., hospitalists, surgeons, or anesthesiologists), and nurses of various specialties.

Figure 7:
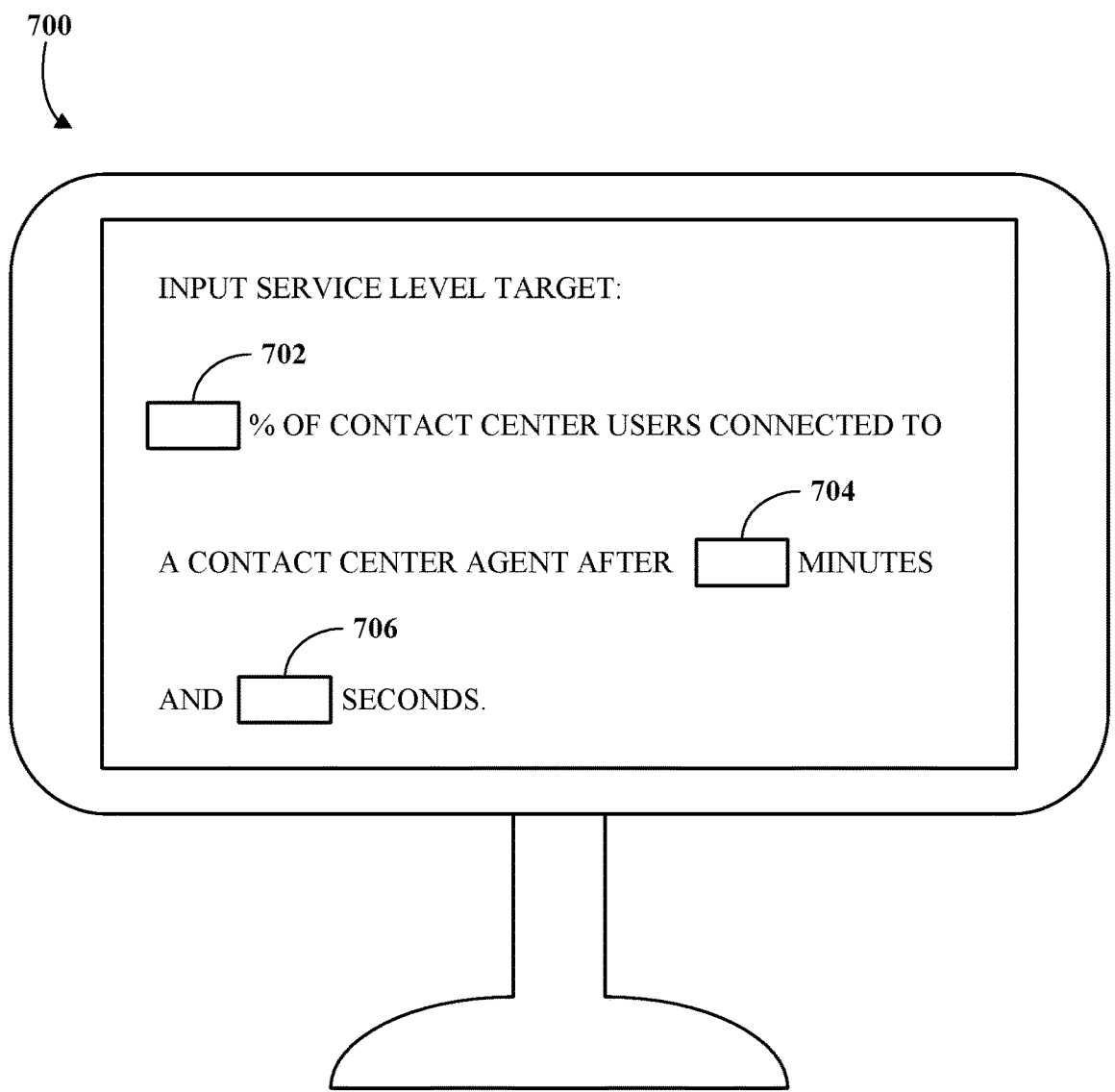
FIG. 7 illustrates an example graphical user interface for inputting a service level target.

FIG. 7 illustrates an example GUI 700 for inputting a service level target. The GUI 700 of FIG. 7 may be used to input the future time 608 and the service level target 610 described in conjunction with FIG. 6. As shown, the GUI 700 is presented at a computer monitor. In alternative implementations, another display unit (e.g., a mobile phone screen, a tablet computer screen, or a laptop screen) may be used. The computer monitor displays an input box 702 for specifying a percentage of contact center users that are to be connected to a contact center agent within a certain time period after requesting the connection. The time period is defined by a number of minutes entered in the input box 704 and a number of second entered in the input box 706. For example, a user could enter that 85% (in the input box 702) of contact center users are to be connected to a contact center agent after 0 minutes (in the input box 704) and 45 seconds (in the input box 706).

FIG. 8 illustrates an example GUI 800 for presenting contact center agent demand. The GUI 800 may correspond to the administrator GUI 614. As shown, the GUI 800 is presented at a computer monitor. In alternative implementations, another display unit (e.g., a mobile phone screen, a tablet computer screen, or a laptop screen) may be used. As shown, the GUI 800 includes a table that includes a column for time, a column for available agents, and column for demanded agents. Each row is associated with a time range (e.g., 13:00-14:00) and indicates a number of available agents and a number of demanded agents for that time range. The GUI 800 also includes a button 802 for requesting extra hours from agents. When the button 802 is selected, (e.g., by clicking a mouse while a cursor is positioned over the button 802) a computer presenting the GUI 800 (e.g., the administrator device 604) transmits a prompt (e.g., the agent prompt 616) to agent devices (e.g., the agent device 606) for the agents associated with the agent devices to accept additional work hours (e.g., overtime hours).

FIG. 9 illustrates an example GUI 900 for prompting a contact center agent to work extra hours. The GUI 900 may correspond to the agent GUI 618 displayed at the agent device 606 to an agent using the agent device 606. As shown, the GUI 900 is presented at a mobile phone screen. In alternative implementations, another display unit (e.g., a computer monitor, a tablet computer screen, or a laptop screen) may be used. As illustrated, the GUI 900 informs the agent that the contact center is expecting a demand search and prompts the user to accept extra work hours. The GUI 900 includes buttons 902A-902C (e.g., buttons 902A, 902B, 902C) for accepting the extra work hours, with each button 902A-902C specifying an hour (e.g., 13:00-14:00) and an amount of money (e.g., $30) that the agent would be paid for those hours. The GUI 900 also includes a button 904 for rejecting the extra hours. The agent may select one of the buttons 902A-902C or the button 904, for example, by touching the associated location on a touch screen of the mobile phone. As illustrated, the GUI 900 allows the agent to select only one of the buttons 902A-902C. However, in some implementations, the agent may be able to select multiple extra work hours. Also, each button 902A-902C is associated with a single hour. In some implementations, the agent may be able to indicate a customized time range, not necessarily an hour, when they are able to work. For example, the agent may indicate that they are available from 13:25 until 14:20.

As illustrated in FIG. 9, a fixed price is offered for each hour when extra work is requested. In some implementations, dynamic pricing may be used, with the price for each hour being determined based on the difference between the number of available agents and the number of demanded agents (e.g., as shown in FIG. 8) for that hour. For example, as shown in FIG. 9, the price offered for working during 14:00-15:00 is $35, which exceeds the $30 offered for 13:00-14:00 and 15:00-16:00 because the difference between the demanded agents and the available agents (per FIG. 8) is greater during 14:00-15:00 than it is during the other two hours. In some cases, the agent (using the agent device) may be able to set a price for their labor, which the administrator (using the administrator device) may accept or reject. In some cases, the administrator (using the administrator device) may set a price for the agent's labor, which the agent (using the agent device) may accept or reject. The administrator may be able to modify the offered price if agents do not accept the offer. For example, the administrator may initially offer $30, and gradually increase the price to $32 or $34 if there are still fewer available agents than demanded agents.

In one example use case, a medical contact center (e.g., associated with a telehealth service provider) uses four modeling engines and a combination engine to predict agent demand as described herein. The four modeling engines include a first modeling engine that takes into account contact center conditions of the previous four days, a second modeling engine that takes into account contact center conditions of the day seven days ago and the day fourteen days ago, a third modeling engine that takes into account the contact center conditions of the current month of the previous year, and a fourth modeling engine that takes into account dates when levels of community spread of viral or bacterial disease (e.g., flu, coronavirus, or strep throat) were within 10% of the current levels. For example, the modeling engines may be running on the evening of Apr. 21, 2023, to predict demand for Apr. 22, 2023. The first modeling engine would consider contact center conditions on Apr. 18-21, 2023. The second modeling engine would consider contact center conditions on Apr. 15, 2023, and Apr. 8, 2023 (which occur on the same day of the week (Saturday) as Apr. 22, 2023). The third modeling engine would consider contact center conditions on Apr. 1-30, 2022. The fourth modeling engine would consider contact center conditions on dates when community spread of viral or bacterial diseases was within 10% of the current levels. It should be noted that the first modeling engine and the second modeling engine can be trained with relatively little training data (e.g., two or three weeks of training data), while the third modeling engine and the fourth modeling engine might require more training data (e.g., two or three years of training data) to be useful.

The combination engine combines the outputs of one or more of the modeling engines to determine a prediction for contact center agent demand. If there is little training data for the modeling engines (e.g., if the contact center recently started using the modeling engines) the output of the first modeling engine and the output of the second modeling engine would be weighted most heavily, as these engines require relatively little training data. However, as more training data becomes available, the third modeling engine might be weighted more heavily. Eventually, the fourth modeling engine might be weighted the most heavily, as users tend to contact medical contact centers when they are sick with viral or bacterial diseases to obtain diagnoses or treatment protocols.

Therefore, if the medical contact center started using the modeling engines relatively recently, with relatively little training data being available, the prediction of combination of modeling engines might be the sum of 0.4 multiplied by the prediction of the first modeling engine, 0.4 multiplied by the prediction of the second modeling engine, 0.1 multiplied by the prediction of the third modeling engine, and 0.1 multiplied by the prediction of the fourth modeling engine. When more training data becomes available, the combination engine might recognize that the third modeling engine and the fourth modeling engine are becoming more capable of generating good predictions. Thus, after a few years of training data are provided to the modeling engines, the prediction of the combination of modeling engines might change to the sum of 0.1 multiplied by the prediction of the first modeling engine, 0.15 multiplied by the prediction of the second modeling engine, 0.25 multiplied by the prediction of the third modeling engine, and 0.5 multiplied by the prediction of the fourth modeling engine.

Using the above technique, the medical contact center may determine that 50 contact center agents are required to reach a specified service level (e.g., 75% of contact center users being connected with a contact center agent within 5 minutes of requesting connection to a contact center agent) on Apr. 22, 2023. The medical contact center may determine that only 40 contact center agents are scheduled to be working on Apr. 22, 2023. In some cases, the medical contact center might automatically transmit a prompt to contact center agents who are not scheduled to be working on Apr. 22, 2023, to work on Apr. 22, 2023. The prompt might include a compensation offer that is higher than the rate that the agents are typically paid. In some cases, the compensation offer may be determined based on at least one of the typical agent compensation rate or the difference between the available contact center agents and the demanded contact center agents. In some cases, if an insufficient number of agents accept the prompt within a threshold time period (e.g., 30 minutes), the compensation offer might be increased by a predetermined amount (e.g., 5%). Alternatively, an administrator might be notified of the difference (e.g., via an administrator device) and the administrator might manually prompt the agents to accept the additional work time.

The above use case could be modified for other industries. For example, a contact center of a stock brokerage could leverage modeling engines that include a first modeling engine that takes into account contact center data of the previous week, a second modeling engine that takes into account contact center data of the previous month, and a third modeling engine that takes into account the contact center data from times with similar financial events (e.g., company earnings reports, United States Federal Reserve announcements, or geopolitical events) to a current time. A combination engine could be used to combine the outputs of these three modeling engines. Initially, when little training data is available, the outputs of the first modeling engine and the second modeling engine are more heavily weighted by the combination engine. However, as the amount of training data increases, the third modeling engine would begin making better predictions of contact center agent demand than the first modeling engine and the second modeling engine. Thus, when more training data becomes available, the combination engine would increase the weight applied to the output of the third modeling engine, while reducing the weight applied to the first modeling engine and the second modeling engine.

Figure 10:
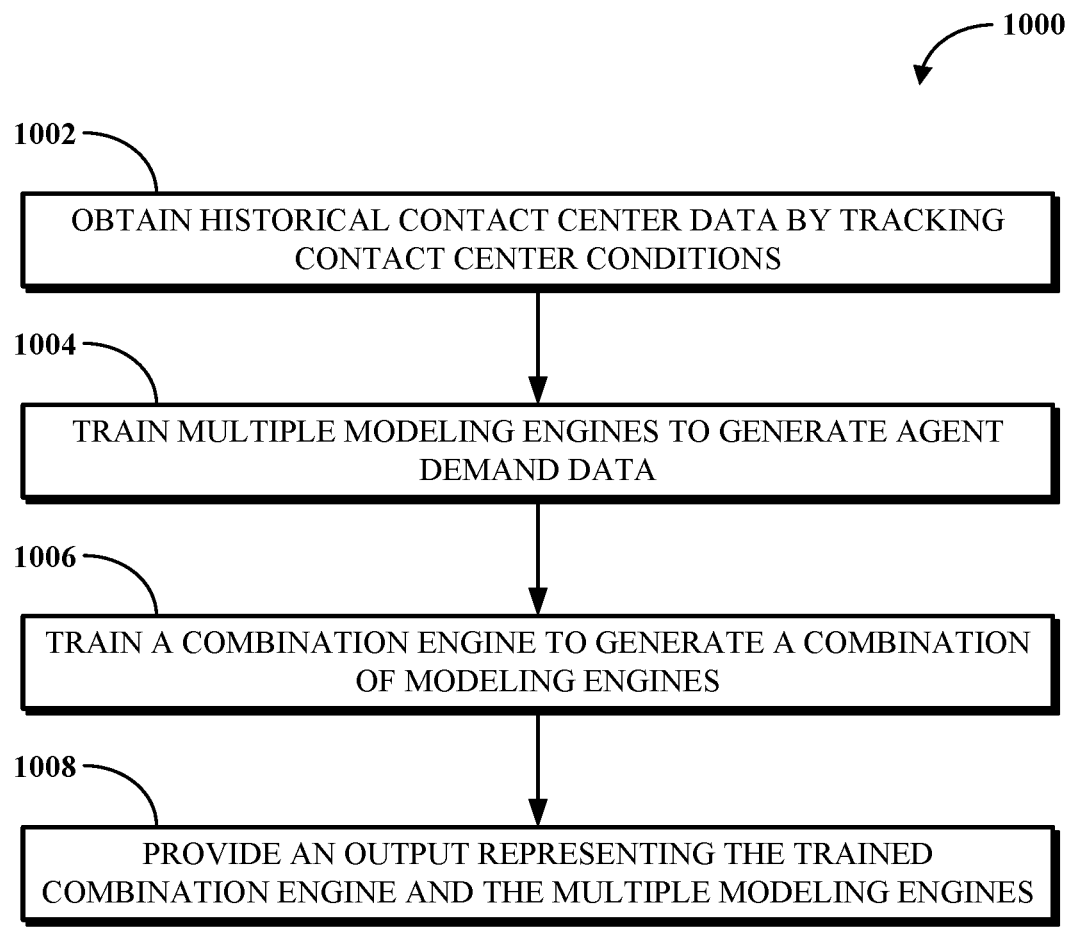
FIG. 10 is a flowchart of an example of a technique for training modeling engines to predict contact center agent demand.
Figure 11:
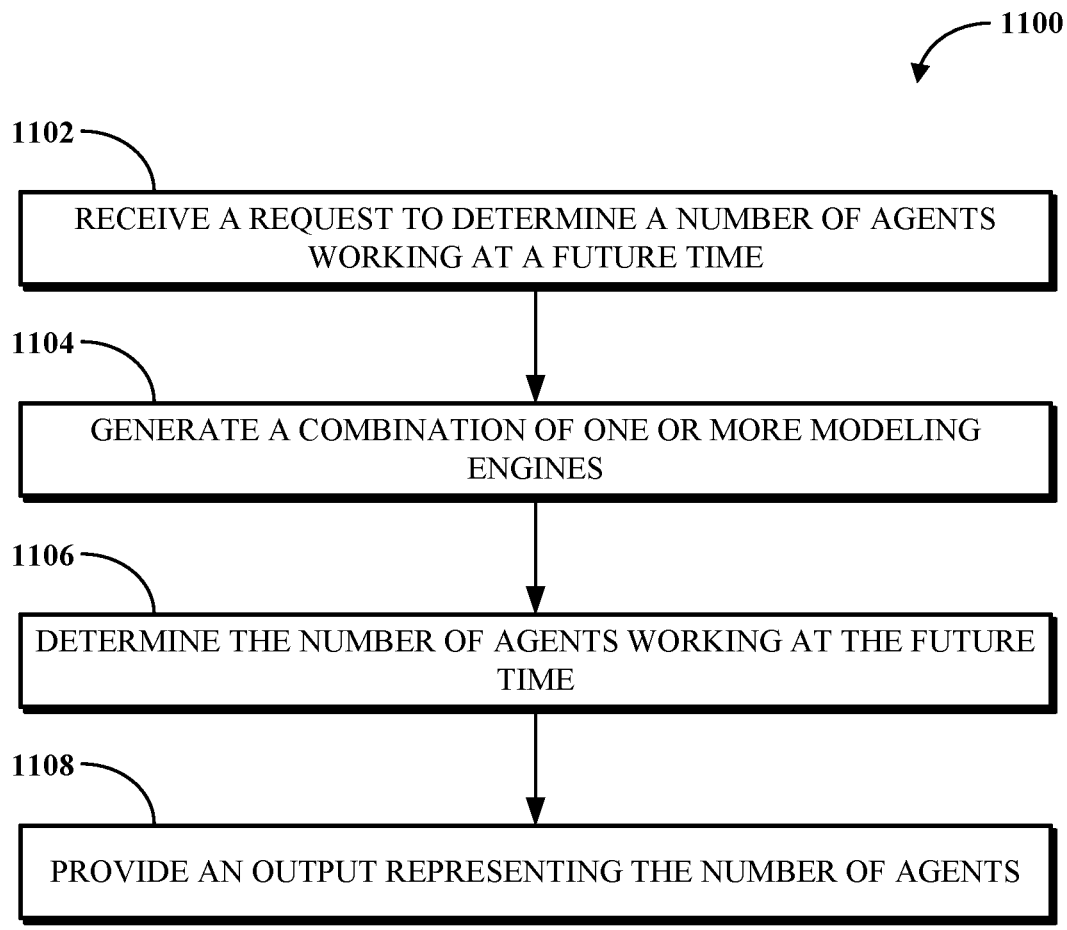
FIG. 11 is a flowchart of an example of a technique for predicting contact center agent demand using multiple modeling engines.

To further describe some implementations in greater detail, reference is next made to examples of techniques for training modeling engines to predict contact center agent demand, as well as inference using the trained modeling engines. FIG. 10 is a flowchart of an example of a technique 1000 for training modeling engines to predict contact center agent demand. FIG. 11 is a flowchart of an example of a technique 1100 for predicting contact center agent demand using multiple modeling engines. The techniques 1000 or 1100 can be executed using computing devices, such as the systems, hardware, and software described with respect to FIGS. 1-9. The technique 1000 or the technique 1100 can be performed, for example, by executing a machine-readable program or other computer-executable instructions, such as routines, instructions, programs, or other code. The steps, or operations, of the technique 1000, the technique 1100, or another technique, method, process, or algorithm described in connection with the implementations disclosed herein can be implemented directly in hardware, firmware, software executed by hardware, circuitry, or a combination thereof.

For simplicity of explanation, the technique 1000 and the technique 1100 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 10 is a flowchart of the technique 1000 for training modeling engines to predict contact center agent demand, for example, based on predictions of engagement volume and wait time distribution. The technique 1000 may be performed at a server (or multiple servers) of a contact center (e.g., the contact center 400). For example, the technique 1000 may be performed at the prediction server 602.

At 1002, the server obtains historical contact center data (e.g., the historical contact center data 502) by tracking contact center conditions of a particular entity (e.g., a retail store, a medical service provider, a state tax department, or a city hall) that uses the contact center. The historical contact center data may include an engagement volume at the contact center and a distribution (e.g., at least one of a mean, a median, or a standard deviation) of wait times for various time ranges (e.g., hours or days). The historical contact center data may be stored at the server or at a data repository (e.g., a database or another data storage unit) with which the server is capable of communicating. According to some implementations, the historical contact center data includes user wait time distribution and an engagement volume for a set of time ranges.

At 1004, the server trains, based on the historical contact center data, multiple modeling engines (e.g., the modeling engines 512A-512C) to generate agent demand data. The agent demand data includes a number of agents that are demanded to reach a specified service level target. The service level target may be specified by an administrator of the contact center associated with the particular entity.

At 1006, the server trains a combination engine (e.g., the combination engine 514) to generate a combination of modeling engines (e.g., the combination of modeling engines 516). The training of the combination engine may be based on the historical contact center data and performance data of the multiple modeling engines. The performance data may be generated by back testing the multiple modeling engines on past time ranges for which data is stored in the historical contact center data. The back testing may include comparing, for the service level that was provided, the predicted number of agents with the actual number of agents that were working.

At 1008, the server provides an output representing the trained combination engine and the multiple modeling engines. The trained combination engine and/or all or a subset of the multiple modeling engines may be used for inference. An example of the use of the trained combination engine and/or all or a subset of the multiple modeling engines for inference is described in conjunction with FIG. 11.

In some implementations, prior to implementing the training technique in blocks 1002-1008, the server receives an input representing a service level target. The multiple modeling engines and the combination engine are trained based on the service level target. Alternatively, the service level target may be provided as input during the inference phase, and the training technique in blocks 1002-1008 may train the server to generate predictions of contact center agent demand for different service level targets.

FIG. 11 is a flowchart of an example of a technique for predicting contact center agent demand using multiple modeling engines. The technique 1100 may be performed at a server of a contact center (e.g., the contact center 400). For example, the technique 1100 may be performed at the prediction server 602. The technique 1100 may be implemented using the trained combination engine and modeling engines generated by the technique 1000 of FIG. 10.

At 1102, the server receives a request to determine a number of agents working at a future time. The request may be transmitted to the server from an administrator device (e.g., the administrator device 604) of an administrator of the contact center. The request may specify the future time, or the server may determine the number of agents for all future times in a set of future times (e.g., all hours when the contact center is expected to be open in the next week). The request may specify a service level target. Alternatively, the service level target may have been specified during training of the modeling engines and/or the combination engine, as described in conjunction with FIG. 10.

At 1104, the server generates, using the combination engine (e.g., the combination engine 514), a combination of one or more modeling engines (e.g., the combination of modeling engines 516) from multiple modeling engines (e.g., the modeling engines 512A-512C) for determining the number of agents. The generated combination may be specific to an entity associated with the contact center. For example, a contact center of a bank may have a different generated combination from a contact center of a bookstore.

At 1106, the server determines the number of agents working at the future time using the combination of the one or more modeling engines. For example, the determined number of agents by the combination of the one or more modeling engines may correspond to a weighted combination of the outputs of each of the one or more modeling engines.

At 1108, the server provides an output representing the determined number of agents. In some case, the determined number of agents is presented, at an administrator device of an administrator of the contact center, in conjunction with the number of agents presently scheduled to be working at the future time. If the determined number of agents is less than the number of agents presently scheduled to be working, the administrator may use the administrator device to prompt additional agents to work. In some cases, if the determined number of agents is less than the number of agents scheduled to be working for a long time period or multiple time periods, the administrator may develop (or cause the development) artificial intelligence-based agents to reduce the workload of the human agents. In some implementations, the output provided by the server includes a prompt, to at least one agent device, for an agent using the at least one agent device to work for additional time or to accept an overtime assignment. Alternatively, this prompt may be transmitted by the administrator device in response to an indication (e.g., clicking a button or touching a location on a touch screen) by an administrator at the administrator device. In some cases, the training phase and the inference phase of the modeling engines and the combination engine are separate. Alternatively, online learning may be used to further train the modeling engines and/or the combination engine after they have been initially trained. In online learning, when the future time occurs, the server may determine an actual number of agents working at the future time and a service level provided by the contact center at the future time. The server may further train the modeling engines and/or the combination engine based on the actual number of agents and the provided service level.

In another implementation of online learning, more data of the contact center may be obtained at the future time. The obtained data may include at least one of engagement (time a contact center user spends speaking with a contact center agent) volume data, engagement length data, contact center user wait time data, or contact center agent availability (down time) data. The combination engine and/or the modeling engines may be further trained based on these obtained contact center data.

Some implementations are described below as numbered examples (Example 1, 2, 3, etc.). These examples are provided as examples only and do not limit the other implementations disclosed herein.

Example 1 is a method, comprising: receiving a request to determine a number of agents working at a future time; generating, using a combination engine, a combination of one or more modeling engines from multiple modeling engines; determining, using the combination of the one or more modeling engines, the number of agents; and providing an output representing the number of agents.

In Example 2, the subject matter of Example 1 includes, obtaining, at the future time, contact center data of the contact center, wherein the contact center data comprises at least one of a number of agents currently working, engagement volume data, engagement length data, contact center user wait time data, or contact center agent availability data; and training, using online learning, the combination engine and the multiple modeling engines based on the obtained contact center data.

In Example 3, the subject matter of Examples 1-2 includes, wherein the output comprises a prompt to accept an overtime assignment that is transmitted to a device of at least one agent.

In Example 4, the subject matter of Examples 1-3 includes, wherein the output comprises a graphical indication of the future time, a graphical indication of the number of agents, and a graphical indication of a number of agents currently scheduled to work at the future time.

In Example 5, the subject matter of Examples 1-4 includes, receiving an input representing a service level target, wherein the number of agents is determined based on the service level target, wherein the service level target represents a proportion of contact center users who are connected to a contact center agent within a given time period after requesting connection to the contact center agent.

In Example 6, the subject matter of Examples 1-5 includes, wherein the multiple modeling engines comprise at least one of a weighted weekly moving average engine, a long short-term memory engine, or a time-series forecasting engine.

In Example 7, the subject matter of Examples 1-6 includes, determining a number of agents who were working at the future time and a service level of the contact center at the future time; and training the multiple modeling engines based on the number of agents who were working and the service level.

Example 8 is a non-transitory computer readable medium storing instructions operable to cause one or more processors to perform operations comprising: receiving a request to determine a number of agents working at a future time; generating, using a combination engine, a combination of one or more modeling engines from multiple modeling engines; determining, using the combination of the one or more modeling engines, the number of agents; and providing an output representing the number of agents.

In Example 9, the subject matter of Example 8 includes, the operations comprising: obtaining, at the future time, contact center data of the contact center, wherein the contact center data comprises at least one of a number of agents currently working, engagement volume data, engagement length data, or contact center agent availability data; and training, using online learning, the combination engine and the multiple modeling engines based on the obtained contact center data.

In Example 10, the subject matter of Examples 8-9 includes, wherein the output comprises a prompt to accept an assignment that is transmitted to a device of an agent.

In Example 11, the subject matter of Examples 8-10 includes, wherein the output comprises a graphical indication of the future time and a graphical indication of the number of agents.

In Example 12, the subject matter of Examples 8-11 includes, the operations comprising: receiving an input representing a service level target for determining the number of agents, wherein the service level target represents a proportion of contact center users who are connected to a contact center agent within a given time period after requesting connection to the contact center agent.

In Example 13, the subject matter of Examples 8-12 includes, wherein the multiple modeling engines comprise at least one of a weighted weekly moving average engine or a long short-term memory engine.

In Example 14, the subject matter of Examples 8-13 includes, the operations comprising: determining a number of agents who were working at the future time and a service level of the contact center at the future time; and training the multiple modeling engines based on the number of agents who were working at the future time and the service level at the future time.

Example 15 is an apparatus comprising: a memory; and a processor configured to execute instructions stored in the memory to: receive a request to determine a number of agents working at a future time; generate, using a combination engine, a combination of one or more modeling engines from multiple modeling engines; determine, using the combination of the one or more modeling engines, the number of agents; and provide an output representing the number of agents.

In Example 16, the subject matter of Example 15 includes, the processor configured to execute the instructions stored in the memory to: obtain, at the future time, contact center data of the contact center, wherein the contact center data comprises at least one of a number of agents currently working, contact center user wait time data, or contact center agent availability data; and train, using online learning, the combination engine and the multiple modeling engines based on the obtained contact center data.

In Example 17, the subject matter of Examples 15-16 includes, wherein the output comprises a prompt, to a device of at least one agent, to work at the future time.

In Example 18, the subject matter of Examples 15-17 includes, wherein the output comprises a graphical indication of the number of agents and a graphical indication of a number of agents presently scheduled to work at the future time.

In Example 19, the subject matter of Examples 15-18 includes, the processor configured to execute the instructions stored in the memory to: receive an input representing a service level target, wherein the number of agents is determined based on the service level target.

In Example 20, the subject matter of Examples 15-19 includes, wherein the multiple modeling engines comprise a weighted weekly moving average engine.

Example 21 is a method, comprising: receiving a request to determine a number of agents working at a future time; generating, using a combination engine, a combination of one or more modeling engines from multiple modeling engines; determining, using the combination of the one or more modeling engines, the number of agents; and providing an output representing the number of agents.

In Example 22, the subject matter of Example 21 includes, obtaining, at the future time, contact center data of the contact center, wherein the contact center data comprises at least one of a number of agents currently working, engagement volume data, engagement length data, contact center user wait time data, or contact center agent availability data; and training, using online learning, the combination engine and the multiple modeling engines based on the obtained contact center data.

In Example 23, the subject matter of Examples 21-22 includes, wherein the output comprises a prompt to accept an overtime assignment that is transmitted to a device of at least one agent.

In Example 24, the subject matter of Examples 21-23 includes, wherein the output comprises a graphical indication of the future time, a graphical indication of the number of agents, and a graphical indication of a number of agents currently scheduled to work at the future time.

In Example 25, the subject matter of Examples 21-24 includes, receiving an input representing a service level target, wherein the number of agents is determined based on the service level target, wherein the service level target represents a proportion of contact center users who are connected to a contact center agent within a given time period after requesting connection to the contact center agent.

In Example 26, the subject matter of Examples 21-25 includes, wherein the multiple modeling engines comprise at least one of a weighted weekly moving average engine, a long short-term memory engine, or a time-series forecasting engine.

In Example 27, the subject matter of Examples 21-26 includes, determining a number of agents who were working at the future time and a service level of the contact center at the future time; and training the multiple modeling engines based on the number of agents who were working and the service level.

Example 28 is a non-transitory computer readable medium storing instructions operable to cause one or more processors to perform operations comprising: receiving a request to determine a number of agents working at a future time; generating, using a combination engine, a combination of one or more modeling engines from multiple modeling engines; determining, using the combination of the one or more modeling engines, the number of agents; and providing an output representing the number of agents.

In Example 29, the subject matter of Example 28 includes, the operations comprising: obtaining, at the future time, contact center data of the contact center, wherein the contact center data comprises at least one of a number of agents currently working, engagement volume data, engagement length data, or contact center agent availability data; and training, using online learning, the combination engine and the multiple modeling engines based on the obtained contact center data.

In Example 30, the subject matter of Examples 28-29 includes, wherein the output comprises a prompt to accept an assignment that is transmitted to a device of an agent.

In Example 31, the subject matter of Examples 28-30 includes, wherein the output comprises a graphical indication of the future time and a graphical indication of the number of agents.

In Example 32, the subject matter of Examples 28-31 includes, the operations comprising: receiving an input representing a service level target for determining the number of agents, wherein the service level target represents a proportion of contact center users who are connected to a contact center agent within a given time period after requesting connection to the contact center agent.

In Example 33, the subject matter of Examples 28-32 includes, wherein the multiple modeling engines comprise at least one of a weighted weekly moving average engine or a long short-term memory engine.

In Example 34, the subject matter of Examples 28-33 includes, the operations comprising: determining a number of agents who were working at the future time and a service level of the contact center at the future time; and training the multiple modeling engines based on the number of agents who were working at the future time and the service level at the future time.

Example 35 is an apparatus comprising: a memory; and a processor configured to execute instructions stored in the memory to: receive a request to determine a number of agents working at a future time; generate, using a combination engine, a combination of one or more modeling engines from multiple modeling engines; determine, using the combination of the one or more modeling engines, the number of agents; and provide an output representing the number of agents.

In Example 36, the subject matter of Example 35 includes, the processor configured to execute the instructions stored in the memory to: obtain, at the future time, contact center data of the contact center, wherein the contact center data comprises at least one of a number of agents currently working, contact center user wait time data, or contact center agent availability data; and train, using online learning, the combination engine and the multiple modeling engines based on the obtained contact center data.

In Example 37, the subject matter of Examples 35-36 includes, wherein the output comprises a prompt, to a device of at least one agent, to work at the future time.

In Example 38, the subject matter of Examples 35-37 includes, wherein the output comprises a graphical indication of the number of agents and a graphical indication of a number of agents presently scheduled to work at the future time.

In Example 39, the subject matter of Examples 35-38 includes, the processor configured to execute the instructions stored in the memory to: receive an input representing a service level target, wherein the number of agents is determined based on the service level target.

In Example 40, the subject matter of Examples 35-39 includes, wherein the multiple modeling engines comprise a weighted weekly moving average engine.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining historical contact center data of a contact center by tracking contact center conditions at a contact center server;
   training, based on the historical contact center data, multiple modeling engines to generate agent demand data representing a number of agents working at a given time;
   training, based on the historical center contact center data and performance data of the multiple modeling engines, a combination engine to generate a combination of one or more modeling engines from the multiple modeling engines, wherein training the combination engine leverages an error metric corresponding to an error between a measured average user wait time and an average user wait time calculated based on at least one of the multiple modeling engines; and providing an output representing the trained combination engine and the trained multiple modeling engines.

2. The method of claim 1, comprising:

receiving an input representing a service level target, wherein training the multiple modeling engines and training the combination engine is based on the service level target, wherein the service level target represents a proportion of contact center users who are connected to a contact center agent within a given time period after requesting connection to the contact center agent.

3. The method of claim 1, wherein the historical contact center data comprises at least one of a number of agents working, user volume data, engagement length data, contact center user wait time data, or contact center agent availability data.

4. The method of claim 1, wherein the historical contact center data comprises a user wait time distribution and a number of agents available for a set of time ranges.

5. The method of claim 1, comprising:

receiving a request to determine the number of agents working at a future time;

generating, using the combination engine, the combination of the one or more modeling engines from the multiple modeling engines; and determining, using the combination of the one or more modeling engines, the number of agents working at the future time.

6. The method of claim 1, wherein the multiple modeling engines comprise at least one of a weighted weekly moving average engine, a long short-term memory engine, or a time-series forecasting engine.

7. The method of claim 1, comprising:

adding additional data to the historical contact center data after initially training the multiple modeling engines; and further training the multiple modeling engines based on the additional data.

8. The method of claim 1, wherein the multiple modeling engines include a first modeling engine that takes into account contact center conditions of previous days, a second modeling engine that takes into account contact center conditions of a same day of previous weeks, and a third modeling engine that takes into account contact center conditions of a current month of a previous year.

9. A non-transitory computer readable medium storing instructions operable to cause one or more processors to perform operations comprising:

obtaining historical contact center data of a contact center by tracking contact center conditions at a contact center server;

training, based on the historical contact center data, multiple modeling engines to generate agent demand data representing a number of agents working at a given time;

training, based on the historical center contact center data and performance data of the multiple modeling engines, a combination engine to generate a combination of one or more modeling engines from the multiple modeling engines, wherein training the combination engine leverages an error metric corresponding to an error between a measured average user wait time and an average user wait time calculated based on at least one of the multiple modeling engines; and providing an output representing the trained combination engine and the trained multiple modeling engines.

10. The computer readable medium of claim 9, the operations comprising:

receiving an input representing a service level target, wherein training the multiple modeling engines is based on the service level target, wherein the service level target represents a proportion of contact center users who are connected to a contact center agent within a given time period after requesting connection to the contact center agent.

11. The computer readable medium of claim 9, wherein the historical contact center data comprises at least one of a number of agents working, engagement length data, contact center user wait time data, or contact center agent availability data.

12. The computer readable medium of claim 9, wherein the historical contact center data comprises a user wait time distribution.

13. The computer readable medium of claim 9, the operations comprising:

receiving a request to determine the number of agents working at a future time;

generating the combination of the one or more modeling engines from the multiple modeling engines; and determining, using the generated combination, the number of agents working at the future time.

14. The computer readable medium of claim 9, wherein the multiple modeling engines comprise at least one of a weighted weekly moving average engine or a long short-term memory engine.

15. The computer readable medium of claim 9, the operations comprising:

adding data to the historical contact center data after initially training the multiple modeling engines; and further training the multiple modeling engines based on the data added to the historical contact center data.

16. An apparatus comprising:

a memory; and a processor configured to execute instructions stored in the memory to:

obtaining historical contact center data of a contact center by tracking contact center conditions at a contact center server;

training, based on the historical contact center data, multiple modeling engines to generate agent demand data representing a number of agents working at a given time;

training, based on the historical center contact center data and performance data of the multiple modeling engines, a combination engine to generate a combination of one or more modeling engines from the multiple modeling engines, wherein training the combination engine leverages an error metric corresponding to an error between a measured average user wait time and an average user wait time calculated based on at least one of the multiple modeling engines; and providing an output representing the trained combination engine and the trained multiple modeling engines.

17. The apparatus of claim 16, the processor configured to execute the instructions stored in the memory to:

receive an input representing a service level target, wherein training the combination engine is based on the service level target, wherein the service level target represents a proportion of contact center users who are connected to a contact center agent within a given time period after requesting connection to the contact center agent.

18. The apparatus of claim 16, wherein the historical contact center data comprises at least one of engagement length data, contact center user wait time data, or contact center agent availability data.

19. The apparatus of claim 16, wherein the historical contact center data comprises a number of agents available for a set of time ranges.

20. The computer readable medium of claim 9, wherein the combination is generated by at least one of weighted sum-based combination, model ensembling, or federation that does not modify the modeling engines and allows the modeling engines to run independently of one another and independently of the combination engine.

* * * * *